US012811152B2

(12) United States Patent
Jang et al.

(10) Patent No.: US 12,811,152 B2
(45) Date of Patent: Nov. 24, 2026

(54) POSITIVE ELECTRODE FOR LITHIUM SECONDARY BATTERY INCLUDING INSULATING LAYER HAVING EXCELLENT WET ADHESION AND LITHIUM SECONDARY BATTERY INCLUDING THE SAME

(71) Applicant: LG Energy Solution, Ltd., Seoul (KR)

(72) Inventors: Seong Keun Jang, Daejeon (KR); Sung Chul Park, Daejeon (KR); Sang A Choi, Daejeon (KR); Sung Soo Yoon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 758 days.

(21) Appl. No.: 18/020,569

(22) PCT Filed: Jul. 29, 2022

(86) PCT No.: PCT/KR2022/011204

§ 371 (c)(1),
(2) Date: Feb. 9, 2023

(87) PCT Pub. No.: WO2023/008953

PCT Pub. Date: Feb. 2, 2023

(65) Prior Publication Data

US 2023/0307650 A1 Sep. 28, 2023

(30) Foreign Application Priority Data

Jul. 30, 2021 (KR) ........................ 10-2021-0100426
Jul. 26, 2022 (KR) ........................ 10-2022-0092191

(51) Int. Cl.
*H01M 10/0525* (2010.01)
*H01M 4/62* (2006.01)
(Continued)

(52) U.S. Cl.
CPC ....... *H01M 4/623* (2013.01); *H01M 10/0525* (2013.01); *H01M 10/4235* (2013.01); *H01M 2004/021* (2013.01); *H01M 2004/028* (2013.01)

(58) Field of Classification Search
None
See application file for complete search history.

(56) References Cited

U.S. PATENT DOCUMENTS 7,709,152 B2 5/2010 Kim et al.
9,698,396 B2 7/2017 Lee et al.
(Continued)

FOREIGN PATENT DOCUMENTS

CN 101212044 A 7/2008
CN 105940520 A 9/2016
(Continued)

OTHER PUBLICATIONS

International Search Report for Application No. PCT/KR2022/011204 mailed Nov. 9, 2022, pp. 1-3.
(Continued)

*Primary Examiner* — Carlos Barcena
(74) *Attorney, Agent, or Firm* — Lerner David LLP

(57) ABSTRACT

The present technology relates to a positive electrode for a lithium secondary battery, which includes an insulating layer having excellent wet adhesion, and a lithium secondary battery including the same, and they have an advantage in that migration of lithium ions in an overlay region of the electrode can be blocked to suppress capacity expression and the like due to the insulating layer having excellent wet adhesion in a liquid electrolyte.

9 Claims, 5 Drawing Sheets

(51) Int. Cl.
*H01M 10/42* (2006.01)
*H01M 4/02* (2006.01)

(56) References Cited

U.S. PATENT DOCUMENTS

| | | | |
|---|---|---|---|
| 2006/0199294 | A1 | 9/2006 | Fujikawa et al. |
| 2009/0061313 | A1 | 3/2009 | Tadano |
| 2011/0052984 | A1 | 3/2011 | Nakamura et al. |
| 2014/0242296 | A1 | 8/2014 | Motoda |
| 2015/0243964 | A1 | 8/2015 | Yu et al. |
| 2016/0260978 | A1 | 9/2016 | Fujii |
| 2016/0329547 | A1 | 11/2016 | Jin et al. |
| 2018/0301684 | A1 | 10/2018 | Tanaka |
| 2020/0373558 | A1 | 11/2020 | Park et al. |
| 2020/0388856 | A1 | 12/2020 | Hayashi |
| 2021/0159505 | A1 | 5/2021 | Kato |

FOREIGN PATENT DOCUMENTS

| | | | |
|---|---|---|---|
| CN | 111033818 | A | 4/2020 |
| EP | 3680960 | A1 | 7/2020 |
| EP | 4207365 | A1 | 7/2023 |
| JP | 2007103356 | A | 4/2007 |
| JP | 2007234418 | A | 9/2007 |
| JP | 200954455 | A | 3/2009 |
| JP | 2009134915 | A | 6/2009 |
| JP | 201154462 | A | 3/2011 |
| JP | 2014032758 | A | 2/2014 |
| JP | 2014165096 | A | 9/2014 |
| JP | 2019163846 | A | 9/2019 |
| JP | 2020119697 | A | 8/2020 |
| JP | 2021086681 | A | 6/2021 |
| KR | 100863733 | B1 | 10/2008 |
| KR | 20140132618 | A | 11/2014 |
| KR | 20150045786 | A | 4/2015 |
| KR | 20160091732 | A | 8/2016 |
| KR | 20180064361 | A | 6/2018 |
| KR | 20180097084 | A | 8/2018 |
| KR | 20190093524 | A | 8/2019 |
| KR | 20230093957 | A | 6/2023 |
| WO | 2006093049 | A1 | 9/2006 |
| WO | 2016049539 | A1 | 3/2016 |
| WO | 2019049886 | A1 | 3/2019 |

OTHER PUBLICATIONS

Wang L, et al. SBR-PVDF based binder for the application of SLMP in graphite anodes. RSC advances. Jun. 2013;3(35):15022-7. 6 pgs.

Tian M, et al., Application of a polyacrylate latex to a lithium iron phosphate cathode as a binder material. Energies. Mar. 30, 2021;14(7):1902. 10 pgs.

【FIG. 1】
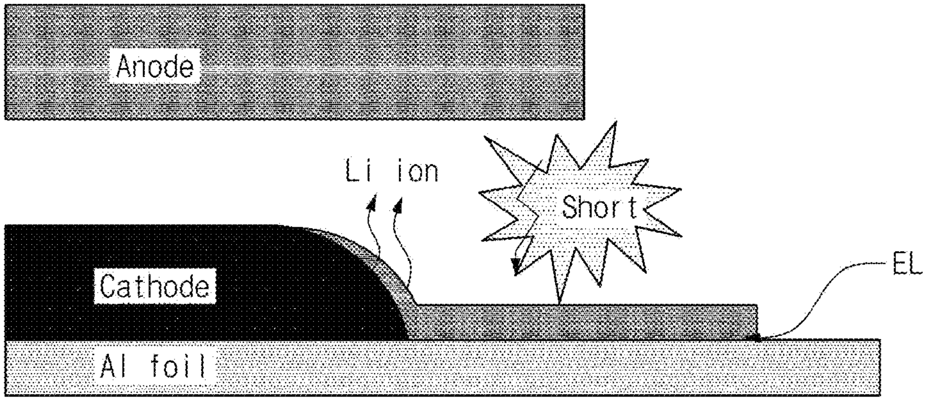

【FIG. 2】
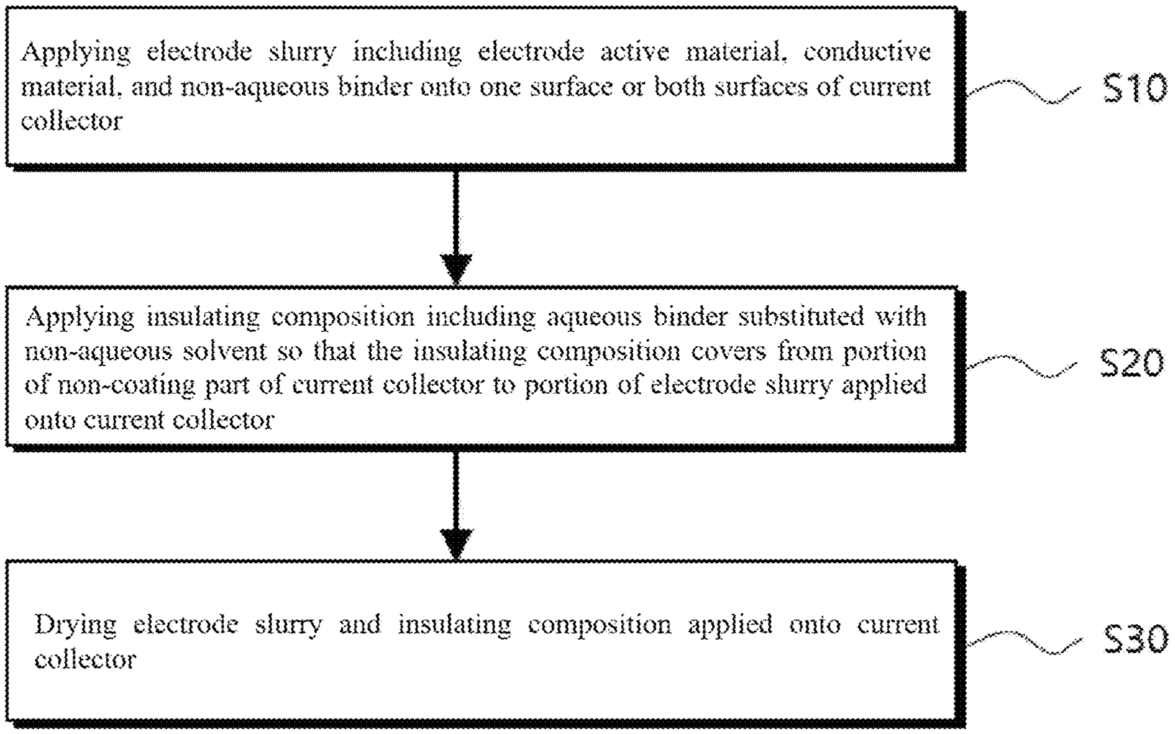

【FIG. 3】
| Example 1 | Comparative Example 1 |
| --- | --- |
| 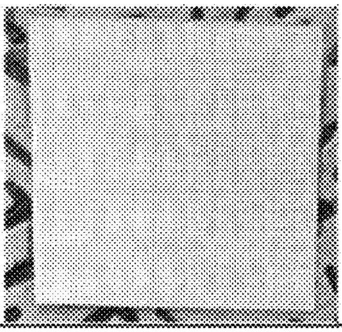 | 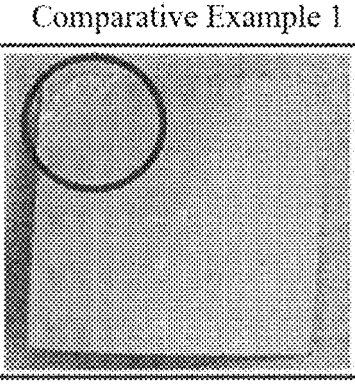 |
| Example 4 | Comparative Example 2 |
| 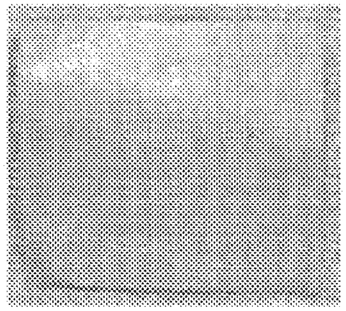 | 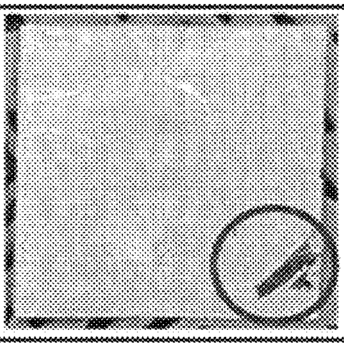 |

【FIG. 4】
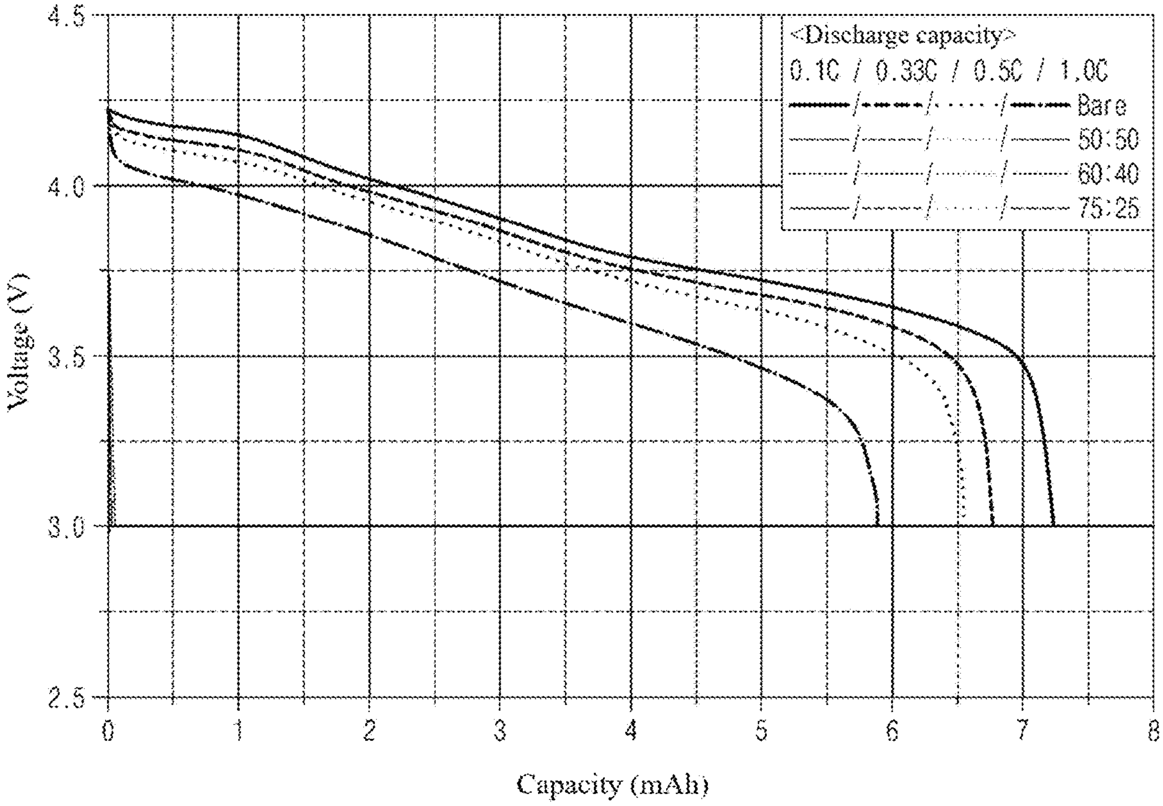

【FIG. 5】
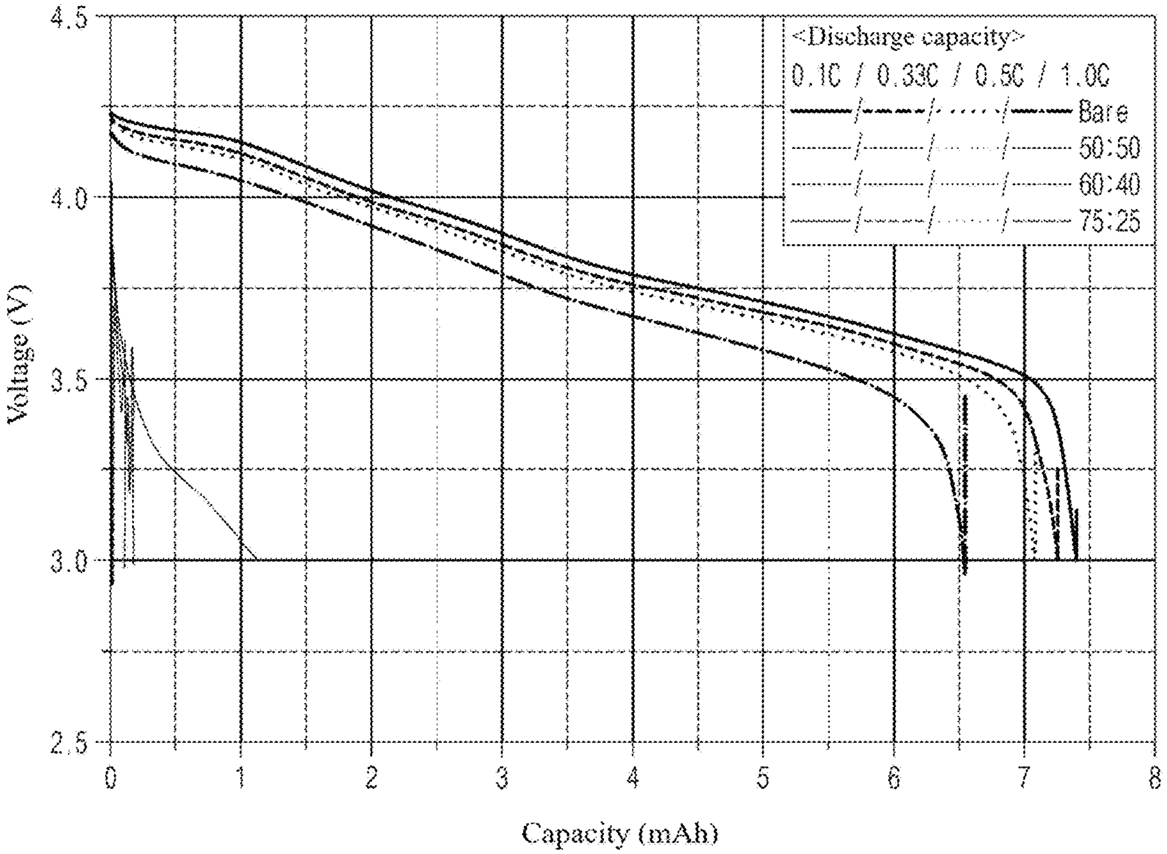

POSITIVE ELECTRODE FOR LITHIUM SECONDARY BATTERY INCLUDING INSULATING LAYER HAVING EXCELLENT WET ADHESION AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2022/011204, filed on Jul. 29, 2022, which claims priority from Korean Patent Application No. 10-2021-0100426, filed on Jul. 30, 2021, and Korean Patent Application No. 10-2022-0092191, filed on Jul. 26, 2022, and the disclosures of which are hereby incorporated by reference in their entirety.

TECHNICAL FIELD

The present disclosure relates to a positive electrode for a lithium secondary battery, which includes an insulating layer having excellent wet adhesion, a method of manufacturing the same, and a lithium secondary battery including the same.

BACKGROUND ART

As the technology for mobile devices is developed and the demand for mobile devices increases, the demand for secondary batteries as a power source is rapidly increasing, and accordingly, many studies have been conducted on batteries which can meet various needs.

Typically, in terms of a battery shape, there is a high demand for thin prismatic and pouch-type batteries that can be applied to products such as mobile phones and the like. Also, in terms of a material, there is a high demand for lithium secondary batteries such as lithium cobalt polymer batteries excellent in energy density, discharge voltage, and safety.

One of the main research tasks related to the secondary batteries is to enhance safety. Battery safety-related accidents are mainly caused by the arrival of an abnormal high temperature state due to a short circuit between a positive electrode and a negative electrode. That is, in normal situations, since a separator is provided between a positive electrode and a negative electrode, electrical insulation is maintained. On the other hand, in abnormal situations in which a battery is excessively charged or discharged, the dendritic growth of an electrode material or an internal short circuit caused by foreign substances occurs, sharp objects such as nails, screws, and the like penetrate a battery, or a battery is excessively deformed by an external force, existing separators have limitations.

Generally, a microporous membrane formed of a polyolefin resin is mainly used as a separator, but the heat-resistant temperature thereof is about 120 to 160° C., so heat resistance is insufficient. Therefore, when an internal short circuit occurs, the separator contracts due to the heat of the short-circuit reaction, and thus the short-circuit part is enlarged, and thermal runaway in which the high heat of reaction is generated occurs. Since this phenomenon mainly occurs at the end of an electrode current collector coated with an electrode active material in the stacking of an electrode, various methods for lowering the possibility of a short circuit of an electrode by an external impact or high temperature have been attempted.

Specifically, to resolve the internal short circuit of a battery, a method of attaching an insulating tape or applying an insulating liquid to the portion of the non-coating part and active material layer of an electrode to form an insulating layer has been proposed. For example, there is a method of applying an insulating binder onto the portion of the non-coating part and active material layer of a positive electrode or applying an insulating liquid in which a mixture of the binder and inorganic particles is dispersed in a solvent to form a coating (hereinafter, referred to as an insulating layer).

Meanwhile, an electrode in an actual secondary battery is present in an immersed state in a liquid electrolyte, and a conventional insulating layer exhibits degraded adhesion (hereinafter, referred to as wet adhesion) while being immersed in a liquid electrolyte and thus does not block the migration of lithium ions in the overlay region of the electrode to cause capacity expression (see FIG. 1). Particularly, when capacity is expressed in the overlay region of the electrode, lithium ions may be precipitated, which may cause the stability of a battery cell to be degraded.

Therefore, there is a need to develop an insulating layer having excellent wet adhesion.

DISCLOSURE

Technical Problem

The present disclosure is directed to providing a positive electrode for a lithium secondary battery, which includes an insulating layer having excellent wet adhesion, a method of manufacturing the same, and a lithium secondary battery including the same.

Technical Solution

One aspect of the present technology provides a positive electrode for a lithium secondary battery, which includes: a current collector; an active material layer formed on one surface or both surfaces of the current collector and including a positive electrode active material, a conductive material, and a non-aqueous binder; and an insulating layer provided on the side of the active material layer, wherein the insulating layer is formed of an aqueous binder substituted with a non-aqueous solvent.

In an embodiment, the insulating layer may be provided on the current collector so that the insulating layer covers from a portion of the non-coating part of the current collector to a portion of the active material layer applied onto the current collector.

In a specific embodiment, the insulating layer may be provided on the current collector so that the insulating layer covers from a portion of the non-coating part of the current collector to a portion of the sliding region of the active material layer applied onto the current collector, and the height of the formed insulating layer may range from 10 to 50% of the height of the active material layer.

In another embodiment, the insulating layer may be provided on the current collector so that the insulating layer covers from a portion of the non-coating part of the current collector to a portion of the sliding region of the active material layer applied onto the current collector, and the height of the formed insulating layer may range from 50 to 100% of the height of the active material layer.

For example, the insulating layer may have an average thickness of 1 μm to 50 m.

In an embodiment, the insulating layer may further include inorganic particles dispersed in the aqueous binder substituted with a non-aqueous solvent. Also, a weight ratio of the inorganic particle and the aqueous binder may range from 1:99 to 95:5.

The inorganic particles may be one or more selected from the group consisting of AlOOH, $Al_2O_3$, γ-AlOOH, $Al(OH)_3$, $Mg(OH)_2$, $Ti(OH)_4$, MgO, CaO, $Cr_2O_3$, $MnO_2$, $Fe_2O_3$, $Co_3O_4$, NiO, $ZrO_2$, $BaTiO_3$, $SnO_2$, $CeO_2$, $Y_2O_3$, $SiO_2$, silicon carbide (SIC), and boron nitride (BN).

In addition, the aqueous binder may be one or more selected from the group consisting of styrene-butadiene rubber, acrylate styrene-butadiene rubber, acrylonitrile-butadiene rubber, acrylonitrile-butadiene-styrene rubber, acrylic rubber, polyethylene oxide, polyvinylpyrrolidone, polyepichlorohydrin, polyphosphazene, polyacrylonitrile, polystyrene, an ethylene-propylene-diene copolymer, polyvinylpyridine, chlorosulphonated polyethylene, latex, polyester resin, an acrylic resin, phenolic resin, an epoxy resin, polyvinyl alcohol, hydroxypropyl methylcellulose, hydroxypropyl cellulose, and diacetyl cellulose.

Additionally, the non-aqueous binder of the active material layer may be one or more selected from the group consisting of polyvinylidene fluoride (PVDF), polyvinylidene fluoride-co-hexafluoropropylene (PVDF-co-HFP), polyethylene oxide (PEO), polyacrylic acid (PAA), polyimide (PI), polyamideimide (PAI), and a polyimide-polyamideimide copolymer (PI-PAI).

In a specific embodiment, the non-aqueous binder may be polyvinylidene fluoride (PVDF). Also, the aqueous binder may be an aqueous binder substituted with a non-aqueous organic solvent, for example, styrene-butadiene rubber substituted with an N-methyl-2-pyrrolidone solvent.

Meanwhile, in an embodiment of the present technology, the insulating layer may have a composition including both an aqueous binder substituted with a non-aqueous solvent and a non-aqueous binder. For example, the insulating layer may have a composition including an aqueous binder and a non-aqueous binder in a weight ratio of 20:80 to 80:20 or 40:60 to 60:40.

Another aspect of the present technology provides a lithium secondary battery including the above-described positive electrode for a secondary battery.

Advantageous Effects

A positive electrode for a lithium secondary battery including an insulating layer having excellent wet adhesion and a lithium secondary battery including the same according to the present technology have an advantage in that the migration of lithium ions in the overlay region of the electrode can be blocked to suppress capacity expression and the like due to the insulating layer having excellent wet adhesion in a liquid electrolyte.

BRIEF DESCRIPTION OF THE DRAWINGS

FIG. 1 is a schematic diagram showing the migration of lithium ions in an overlay region of an electrode.

FIG. 2 is a flow chart of a method of manufacturing a positive electrode for a lithium secondary battery according to the present technology.

FIG. 3 shows results of measuring the wet adhesion of insulating layers of examples and comparative examples.

FIG. 4 is a graph obtained by measuring discharge capacity to evaluate a capacity expression of battery cells of Examples 4 to 6 (room-temperature discharge characteristics).

FIG. 5 is a graph obtained by measuring discharge capacity to evaluate the capacity expression of the battery cells of Examples 4 to 6 (high-temperature discharge characteristics).

DETAILED DESCRIPTION OF THE PREFERRED EMBODIMENTS

As the present invention allows for various changes and a variety of embodiments, particular embodiments will be described in detail in the detailed description.

However, this is not intended to limit the present invention to specific embodiments, and it should be understood that all changes, equivalents, or substitutes within the spirit and technical scope of the present invention are included in the present invention.

In the present disclosure, it should be understood that the term "include(s)" or "have(has)" is merely intended to indicate the presence of features, numbers, steps, operations, components, parts, or combinations thereof, and not intended to preclude the possibility of the presence of addition of one or more other features, numbers, steps, operations, components, parts, or combinations thereof.

In addition, in the present disclosure, when a portion of a layer, film, region, plate, or the like is referred to as being "on" another portion, this includes not only the case where the portion is "directly on" but also the case where there is another portion interposed therebetween. Conversely, when a portion of a layer, film, region, plate, or the like is referred to as being "under" another portion, this includes not only the case where the portion is "directly under" but also the case where there is another portion interposed therebetween. Also, herein, what is referred to as being disposed "on" may include being disposed not only on an upper part but also on a lower part.

As used herein, an "insulating layer" refers to an insulating member formed by application from at least a portion of the non-coating part of an electrode current collector to at least a portion of an electrode active material layer and drying.

As used herein, "wet adhesion" refers to the adhesion of an insulating layer as measured in an immersed state in a liquid electrolyte. More specifically, the wet adhesion may be measured by immersing a metal specimen including an insulating layer formed therein in a liquid electrolyte, applying ultrasonic waves, and then determining whether the insulating layer is swelled or detached.

As used herein, a "metal specimen" is a space where an insulating layer is formed and may refer to a metal current collector used in manufacture of an electrode, specifically, a metal current collector blanked to have a predetermined width and a predetermined length. For example, the metal specimen may be aluminum, copper, or an aluminum alloy.

As used herein, an "overlay region" may refer to a region where an insulating layer is formed in an electrode. More specifically, in an electrode in which an active material layer is formed, the insulating layer covers from at least a portion of a non-coating part to at least a portion of the active material layer, and a region where an insulating layer is formed on the active material layer is referred to as an overlay region.

Hereinafter, the present invention will be described in further detail.

Positive Electrode for Lithium Secondary Battery

One aspect of the present technology provides a positive electrode for a lithium secondary battery, which includes: a current collector; an active material layer formed on one surface or both surfaces of the current collector and including a positive electrode active material, a conductive material, and a non-aqueous binder; and an insulating layer provided on the side of the active material layer.

In addition, the insulating layer is formed of an aqueous binder substituted with a non-aqueous solvent. According to the present technology, in the formation of the insulating layer, an aqueous binder may be applied to increase wet adhesion, and the substitution with a non-aqueous solvent may allow the insulating layer to be stably applied even to a positive electrode vulnerable to moisture.

Since the electrode for a secondary battery according to the present technology includes the insulating layer having excellent wet adhesion, there is an advantage in that the migration of lithium ions in the overlay region of the electrode can be blocked to suppress capacity expression and the like.

Generally, a positive electrode in a secondary battery is present in an immersed state in a liquid electrolyte, and accordingly, a conventional insulating layer exhibits degraded wet adhesion while being immersed in a liquid electrolyte and does not block the migration of lithium ions in the overlay region of the positive electrode to cause capacity expression. Particularly, when capacity is expressed in the overlay region of the positive electrode, lithium ions may be precipitated, which may cause the stability of a battery cell to be degraded. In the present technology, since an insulating layer is formed using an aqueous binder substituted with the same non-aqueous solvent as a solvent of a positive electrode slurry in manufacture of a positive electrode for a secondary battery, the gelation between an active material layer and a coating layer, which is caused by a difference in the type of a binder, is suppressed. Particularly, since the insulating layer is dried simultaneously with the solvent of a positive electrode slurry in a drying process, the cracking between an active material layer and an insulating layer, which is caused by a difference in a drying rate or temperature, can be prevented from occurring.

In addition, the insulating layer has an effect of increasing an electrical insulation property and thermal safety and suppressing thermal expansion by further including inorganic particles.

Meanwhile, the wet adhesion of the insulating layer may be measured by immersing a metal specimen including an insulating layer formed therein in a liquid electrolyte, applying ultrasonic waves, and then determining whether the insulating layer formed in the metal specimen is swelled or detached.

The liquid electrolyte used in the measurement of wet adhesion may include an organic solvent and an electrolyte salt, and the electrolyte salt may be a lithium salt. As the lithium salt, any lithium salt that is typically used in a non-aqueous liquid electrolyte for a lithium secondary battery may be used without limitation. For example, an anion of the lithium salt may include any one or two or more selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $CF_3(CF_2)_7SO_3^-$, $CF_3CO_2^-$, $CH_3CO_2^-$, $SCN^-$, and $(CF_3CF_2SO_2)_2N^-$.

As the above-described organic solvent included in the liquid electrolyte, any organic solvent that is typically used in a liquid electrolyte for a lithium secondary battery may be used without limitation. For example, an ether, an ester, an amide, a linear carbonate, a cyclic carbonate, or the like may be used alone or in combination of two or more thereof. Among them, a cyclic carbonate, a linear carbonate, or a carbonate compound which is a mixture thereof may be typically used.

In the positive electrode for a lithium secondary battery according to the present technology, the insulating layer may include an aqueous binder.

In a specific embodiment, the aqueous binder may be one or more selected from the group consisting of styrene-butadiene rubber, acrylate styrene-butadiene rubber, acrylonitrile-butadiene rubber, acrylonitrile-butadiene-styrene rubber, acrylic rubber, polyethylene oxide, polyvinylpyrrolidone, polyepichlorohydrin, polyphosphazene, polyacrylonitrile, polystyrene, an ethylene-propylene-diene copolymer, polyvinylpyridine, chlorosulphonated polyethylene, latex, polyester resin, an acrylic resin, phenolic resin, an epoxy resin, polyvinyl alcohol, hydroxypropyl methylcellulose, hydroxypropyl cellulose, and diacetyl cellulose. In a specific embodiment, the aqueous binder may be one or more selected from the group consisting of styrene-butadiene rubber, acrylate styrene-butadiene rubber, acrylonitrile-butadiene rubber, and acrylonitrile-butadiene-styrene rubber. For example, the aqueous binder may be styrene-butadiene rubber.

Conventionally, polyvinylidene fluoride (hereinafter, referred to as PVDF) was used as a binder for an insulating layer of a positive electrode, but PVDF exhibits degraded wet adhesion while being immersed in a liquid electrolyte. Accordingly, in the present technology, styrene-butadiene rubber may be used as a binder polymer. Meanwhile, when styrene-butadiene rubber is used as the binder polymer, water may be used as a solvent. However, in this case, when an insulating composition is applied simultaneously with a positive electrode slurry, the gelation between the insulating composition and the positive electrode slurry, which is caused by a difference in the type of a binder, may occur.

In a specific embodiment, the aqueous binder may be an aqueous binder substituted with a non-aqueous organic solvent. Here, the non-aqueous organic solvent may be one or more selected from the group consisting of N-methylpyrrolidone (NMP), dimethyl formamide (DMF) and dimethyl acetamide (DMAc), dimethyl sulfoxide (DMSO), ethylene carbonate (EC), diethyl carbonate (DEC), ethyl methyl carbonate (EMC), dimethyl carbonate (DMC), propylene carbonate (PC), dipropyl carbonate (DPC), butylene carbonate (BC), methyl propyl carbonate (MPC), ethyl propyl carbonate (EPC), acetonitrile, dimethoxyethane, tetrahydrofuran (THF), γ-butyrolactone, methyl alcohol, ethyl alcohol, and isopropyl alcohol.

For example, the aqueous binder may be styrene-butadiene rubber substituted with an NMP solvent. More specifically, an insulating layer may be formed by applying an insulating composition so that the insulating layer covers from at least a portion of a non-coating part to at least a portion of the active material layer and then drying the same at about 50 to 300° C. In this case, in the insulating layer, a solvent is removed in the drying process, and styrene-butadiene rubber dispersed in the solvent is substituted with NMP, and thus styrene-butadiene rubber substituted with NMP may be present.

In addition, the insulating layer can enhance the safety of a battery by including inorganic particles, and the strength of the insulating layer can also be enhanced. The amount of the inorganic particles may be appropriately adjusted in consideration of the viscosity of an insulating composition, thermal resistance, an insulating property, a filling effect, dispersibility, stability, or the like. Generally, as the size of inorganic particles increases, the viscosity of a composition including the same increases, and the possibility of sedimentation in an insulating composition increases. Also, as the size of the inorganic particles decreases, thermal resistance increases. Therefore, considering the above points, an appropriate type and size of inorganic particles may be selected, and if necessary, at least two types of inorganic particles may be used.

In a specific embodiment, the inorganic particles of the insulating layer may be one or more selected from the group consisting of AlOOH, $Al_2O_3$, γ-AlOOH, $Al(OH)_3$, $Mg(OH)_2$, $Ti(OH)_4$, MgO, CaO, $Cr_2O_3$, $MnO_2$, $Fe_2O_3$, $Co_3O_4$, NiO, $ZrO_2$, $BaTiO_3$, $SnO_2$, $CeO_2$, $Y_2O_3$, $SiO_2$, silicon carbide (SIC), and boron nitride (BN), specifically, one or more selected from the group consisting of AlOOH, $Al_2O_3$, γ-AlOOH, and $Al(OH)_3$. For example, the inorganic particles may be AlOOH.

A weight ratio of the inorganic particle and the aqueous binder may range from 1:99 to 95:5, 10:90 to 70:30, 20:80 to 60:40, or 40:60 to 60:40. For example, a weight ratio of the inorganic particle and aqueous binder in the insulating composition may be 50:50. Meanwhile, when the amount of the aqueous binder is excessively small, it may be difficult to obtain an insulating effect desired in the present technology, and adhesion with an electrode may be degraded. On the other hand, when the amount of the aqueous binder is excessively large, the insulating composition drips in an overlay region in coating of an electrode, and thus the safety of a battery cell may be degraded.

The inorganic particles may have an average particle diameter of 0.1 μm to 100 μm, specifically, 0.5 μm to 80 μm, 1 μm to 50 μm, 2 μm to 30 μm, 3 μm to 20 μm, or 5 μm to 10 μm. When the size of inorganic particles falls within the above-described range, the inorganic particles can be uniformly applied in the electrode, and the resistance of lithium ions can be minimized to ensure the performance of a lithium secondary battery.

In another embodiment, the insulating composition may include first and second inorganic particles having mutually different particle diameters and may have a bimodal particle size distribution. This means that the inorganic particles are composed of a mixture of small-sized particles and large-sized particles, and small-sized second inorganic particles may fill the empty space between large-sized first inorganic particles, and an appropriate amount of inorganic particles may be dispersed. However, the present invention is not limited thereto.

Meanwhile, the insulating layer may have a thickness ranging from 0.2 μm to 100 μm, specifically 1 μm to 50 μm, and more specifically 1 μm to 30 μm, 2 μm to 30 μm, 3 μm to 20 μm, or 5 μm to 15 μm. When the coating layer is excessively thin, it may be difficult to expect an effect of enhancing safety by applying the insulating layer.

Furthermore, the active material layer may include a positive electrode active material. In a specific embodiment, any typically used positive electrode active material may be used as the positive electrode active material, and a lithium manganese oxide, a lithium cobalt oxide, a lithium nickel oxide, a lithium iron oxide, or a lithium composite oxide made by combining them may be used, but the present invention is not limited thereto.

In addition, the amount of the positive electrode active material may be 85 to 95 parts by weight, specifically, 88 to 95 parts by weight, 90 to 95 parts by weight, 86 to 90 parts by weight, or 92 to 95 parts by weight with respect to 100 parts by weight of the active material layer.

Additionally, the conductive material may be used to enhance the performance, such as electrical conductivity, of the positive electrode, and one or more selected from the group consisting of natural graphite, artificial graphite, carbon black, acetylene black, Ketjen black, and carbon fiber may be used. For example, the conductive material may include acetylene black.

In addition, the conductive material may be included in an amount of 1 to 10 parts by weight, specifically 2 to 8 parts by weight or 2 to 6 parts by weight with respect to 100 parts by weight of the active material layer.

Additionally, the binder may include one or more resins selected from the group consisting of a polyvinylidene fluoride-hexafluoropropylene copolymer (PVDF-co-HFP), polyvinylidene fluoride, polyacrylonitrile, polymethyl methacrylate, and a copolymer thereof. As an example, the binder may include polyvinylidene fluoride.

In addition, the binder may be included in an amount of 1 to 10 parts by weight, specifically, 2 to 8 parts by weight or 2 to 6 parts by weight with respect to 100 parts by weight of the active material layer.

Although there is no particular limitation on the average thickness of the active material layer, the average thickness may specifically be 10 μm to 500 μm or 50 μm to 400 μm, and more specifically, 50 μm to 350 μm, 100 μm to 400 μm, 100 μm to 400 μm, 200 μm to 300 μm, or 50 μm to 250 μm.

Meanwhile, as a current collector of the positive electrode for a lithium secondary battery according to the present technology, any current collector that does not cause a chemical change in a battery and has high conductivity may be used. For example, stainless steel, aluminum, nickel, titanium, calcined carbon, or the like may be used, and aluminum or stainless steel whose surface has been treated with carbon, nickel, titanium, silver, or the like may also be used. Also, fine irregularities may be formed on the surface of the current collector to increase the adhesion of the positive electrode active material, and various forms such as a film, a sheet, a foil, a net, a porous material, a foam, and a non-woven fabric are possible. Also, the average thickness of the current collector may be appropriately applied in a range of 3 to 500 μm in consideration of the conductivity and total thickness of a positive electrode to be manufactured.

Method of Manufacturing Positive Electrode for Lithium Secondary Battery

Another aspect of the present technology provides a method of manufacturing a positive electrode for a lithium secondary battery, which includes: applying a positive electrode slurry including a positive electrode active material, a conductive material, and a non-aqueous binder onto one surface or both surfaces of a current collector; applying an insulating composition including an aqueous binder substituted with a non-aqueous solvent so that the insulating composition covers from at least a portion of the non-coating part of the current collector to a portion of the positive electrode slurry applied onto the current collector; and drying the positive electrode slurry and insulating composition applied onto the current collector. Also, the positive electrode slurry and the insulating composition include the same non-aqueous solvent.

FIG. 2 is a flow chart of the method of manufacturing a positive electrode for a lithium secondary battery according to the present technology. Referring to FIG. 2, in the method of manufacturing a positive electrode for a lithium secondary battery according to the present technology, a positive electrode slurry may be applied onto one surface or both surfaces of a current collector, and an insulating composition may be applied so that the insulating composition covers from at least a portion of the non-coating part of the current collector to a portion of the positive electrode slurry applied onto the current collector. Meanwhile, the insulating composition may be applied in a state in which the positive electrode slurry is not dried. Here, the undried slurry may refer to a slurry not having undergone a separate drying process in a drying apparatus or equipment. Also, in the present technology, drying the positive electrode slurry and insulating composition applied onto the current collector may be included. Particularly, according to the method of manufacturing a positive electrode for a lithium secondary battery of the present technology, the positive electrode slurry and insulating composition applied onto the current collector are simultaneously dried to increase adhesion between the positive electrode active material and the insulating layer, and accordingly, the interfacial resistance therebetween can be decreased, and a dense insulating layer in which mechanical property problems such as breakage and the like are improved can be formed. Also, the efficiency of the positive electrode manufacturing process can be increased.

Meanwhile, the method of manufacturing a positive electrode for a lithium secondary battery according to the present technology is characterized in that the positive electrode slurry and the insulating composition include the same non-aqueous organic solvent. When the positive electrode slurry and the insulating composition use the same solvent, gelation caused by using different types of binders or cracking caused by a difference in boiling point during a drying process can be resolved.

The non-aqueous organic solvent may be one or more selected from the group consisting of N-methyl-pyrrolidone (NMP), dimethyl formamide (DMF) and dimethyl acetamide (DMAc), dimethyl sulfoxide (DMSO), ethylene carbonate (EC), diethyl carbonate (DEC), ethyl methyl carbonate (EMC), dimethyl carbonate (DMC), propylene carbonate (PC), dipropyl carbonate (DPC), butylene carbonate (BC), methyl propyl carbonate (MPC), ethyl propyl carbonate (EPC), acetonitrile, dimethoxyethane, tetrahydrofuran (THF), γ-butyrolactone, methyl alcohol, ethyl alcohol, and isopropyl alcohol.

In a specific embodiment, the non-aqueous organic solvent may be one or more selected from the group consisting of NMP, DMF, DMAc, and DMSO, specifically, one or more selected from the group consisting of NMP, DMF, and DMAc.

For example, the non-aqueous organic solvent may be an amide-based organic solvent, and the same solvent as a solvent used in preparation of a positive electrode slurry may be used. The non-aqueous organic solvent may be NMP.

When NMP is used as a solvent of the positive electrode slurry, a solvent of the insulating composition may be NMP, and particularly, NMP may be used as a solvent of the insulating composition to prevent cracking and the like that occur at the boundary between the insulating coating layer and the active material layer in the overlay region of an electrode. The insulating composition for an electrode of a secondary battery according to the present technology may be applied and dried simultaneously with the positive electrode slurry. Particularly, NMP may be used as a substitution solvent in the drying process.

The method of manufacturing a positive electrode for a lithium secondary battery according to the present technology will be described in detail below.

Application of a Positive Electrode Slurry onto One Surface or Both Surfaces of Current Collector (S10)

The method of manufacturing a positive electrode for a lithium secondary battery according to the present technology includes applying a positive electrode slurry onto one surface or both surfaces of a current collector.

In this case, as the current collector, any current collector that does not cause a chemical change in a battery and has high conductivity may be used. For example, stainless steel, aluminum, nickel, titanium, calcined carbon, or the like may be used, and aluminum or stainless steel whose surface has been treated with carbon, nickel, titanium, silver, or the like may also be used. For example, the current collector may be aluminum.

In addition, as the positive electrode active material in the slurry for a positive electrode active material layer, any positive electrode active material that is typically used in a positive electrode may be used, and a lithium manganese oxide, a lithium cobalt oxide, a lithium nickel oxide, a lithium iron oxide, or a lithium composite oxide made by combining them may be used, but the present invention is not limited thereto.

The non-aqueous binder included in the slurry for a positive electrode active material layer may include one or more resins selected from the group consisting of a polyvinylidene fluoride-hexafluoropropylene copolymer (PVDF-co-HFP), polyvinylidene fluoride, polyacrylonitrile, polymethyl methacrylate, and a copolymer thereof. As an example, the binder may include polyvinylidene fluoride.

In addition, the conductive material may be used to enhance the performance, such as electrical conductivity, of the positive electrode, and one or more selected from the group consisting of natural graphite, artificial graphite, carbon black, acetylene black, Ketjen black, and carbon fiber may be used. For example, the conductive material may include acetylene black.

Furthermore, the solvent used in the positive electrode slurry is a non-aqueous organic solvent, and the non-aqueous organic solvent may be one or more selected from the group consisting of N-methyl-pyrrolidone (NMP), dimethyl formamide (DMF) and dimethyl acetamide (DMAc), dimethyl sulfoxide (DMSO), ethylene carbonate (EC), diethyl carbonate (DEC), ethyl methyl carbonate (EMC), dimethyl carbonate (DMC), propylene carbonate (PC), dipropyl carbonate (DPC), butylene carbonate (BC), methyl propyl carbonate (MPC), ethyl propyl carbonate (EPC), acetonitrile, dimethoxyethane, tetrahydrofuran (THF), γ-butyrolactone, methyl alcohol, ethyl alcohol, and isopropyl alcohol and may be, for example, NMP.

Application of Insulating Composition so that the Insulating Composition Covers from at Least a Portion of the Non-Coating Part of the Current Collector to a Portion of the Positive Electrode Slurry Applied onto the Current Collector (S20)

The method of manufacturing a positive electrode for a lithium secondary battery according to the present technology includes applying an insulating composition including inorganic particles and an aqueous binder so that the insulating composition covers from at least a portion of the non-coating part of the current collector to a portion of the positive electrode slurry applied onto the current collector.

In this case, the positive electrode slurry may be in an undried state. Here, the undried slurry may refer to a slurry having not undergone a separate drying process in a drying apparatus or equipment.

The insulating composition may provide excellent wet adhesion by including inorganic particles and an aqueous binder. Accordingly, the migration of lithium ions can be suppressed in the overlay region of the positive electrode, and lithium ions can be prevented from being precipitated.

Lithium Secondary Battery

Still another aspect of the present technology provides a lithium secondary battery including the above-described positive electrode for a lithium secondary battery according to the present technology.

The lithium secondary battery according to the present technology may include the above-described positive electrode according to the present technology, a negative electrode, and a separator interposed between the positive electrode and the negative electrode.

Particularly, the lithium secondary battery according to the present technology has an advantage in that the migration of lithium ions in the overlay region of the electrode can be blocked to suppress capacity expression and the like due to the insulating layer having excellent wet adhesion in a liquid electrolyte. Accordingly, the lithium secondary battery according to the present technology can exhibit enhanced stability.

In this case, the negative electrode may include a negative electrode current collector and a negative electrode active material layer provided on the negative electrode current collector and including a negative electrode active material. Specifically, the negative electrode is manufactured by applying a negative electrode active material on a negative electrode current collector, followed by drying and pressing, and as necessary, the negative electrode may optionally further include a conductive material, an organic binder polymer, a filler, and the like as described above.

As the negative electrode active material, for example, carbon and graphite materials such as graphite having a completely layered crystal structure such as natural graphite, soft carbon having a low crystallinity layered crystal structure (graphene structure; a structure in which hexagonal honeycomb planes of carbon are arranged in layers), hard carbon in which these structures are mixed with amorphous parts, artificial graphite, expanded graphite, carbon fiber, non-graphitizable carbon, carbon black, carbon nanotubes, fullerenes, activated carbon, and the like; metal composite oxides such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, Group 1, Group 2 and Group 3 elements of the periodic table, halogens; $0 \le x \le 1$; $1 \le y \le 3$; $1 \le z \le 8$); lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers such as polyacetylene and the like; Li—Co—Ni-based materials; titanium oxide; lithium titanium oxide, and the like may be used.

In an embodiment, the negative electrode active material may include both graphite and silicon (Si)-containing particles. As the graphite, any one or more of natural graphite having a layered crystal structure and artificial graphite having an isotropic structure may be included, and as the silicon (Si)-containing particles, silicon (Si) particles, silicon oxide ($SiO_2$) particles, or a mixture of silicon (Si) particles and silicon oxide ($SiO_2$) particles, which are particles including silicon (Si) as a main metal component, may be included.

In this case, the negative electrode active material may include, with respect to 100 parts by weight of the negative electrode active material, 80 to 95 parts by weight of graphite and 1 to 20 parts by weight of silicon (Si)-containing particles. In the present technology, by adjusting the amounts of the graphite and silicon (Si)-containing particles included in the negative electrode active material within the above-described ranges, lithium consumption and irreversible capacity loss during initial charging and discharging of the battery can be reduced, and charge capacity per unit mass can be enhanced.

In addition, the negative electrode active material layer may have an average thickness of 100 μm to 200 μm, specifically, 100 μm to 180 μm, 100 μm to 150 μm, 120 μm to 200 μm, 140 μm to 200 μm, or 140 μm to 160 μm.

Additionally, the negative electrode current collector is not particularly limited as long as it does not cause a chemical change in the battery and has high conductivity. For example, copper, stainless steel, nickel, titanium, calcined carbon, or the like may be used, and copper or stainless steel whose surface has been treated with carbon, nickel, titanium, silver, or the like may also be used.

In addition, like the positive electrode current collector, the negative electrode current collector may have fine irregularities formed on the surface thereof to increase the adhesion of the negative electrode active material, and various forms such as a film, a sheet, a foil, a net, a porous body, a foam, and a nonwoven body are possible. Also, the average thickness of the negative electrode current collector may be appropriately applied in a range of 3 to 500 μm in consideration of the conductivity and total thickness of a negative electrode to be manufactured.

Additionally, the separator is interposed between the positive electrode and the negative electrode, and an insulating thin film having high ion permeability and mechanical strength is used. Although the separator is not particularly limited as long as it is typically used in the art, specifically, a sheet or non-woven fabric made of chemical-resistant and hydrophobic polypropylene, glass fiber, polyethylene, or the like may be used, and in some cases, a composite separator in which a porous polymer substrate such as the sheet or non-woven fabric is coated with inorganic particles/organic particles by an organic binder polymer may be used. When a solid electrolyte such as a polymer or the like is used as an electrolyte, the solid electrolyte may serve as the separator. Also, the separator may have an average pore diameter of 0.01 to 10 μm and an average thickness of 5 to 300 m.

Meanwhile, the positive electrode and the negative electrode may be accommodated in a cylindrical battery, a prismatic battery, or a pouch-type battery while being wound in the form of a jelly roll or accommodated in a folding or stack-folding type in a pouch-type battery, but the present invention is not limited thereto.

In addition, the lithium salt-containing liquid electrolyte according to the present technology may consist of a liquid electrolyte and a lithium salt. As the liquid electrolyte, a non-aqueous organic solvent, an organic solid electrolyte, an inorganic solid electrolyte, or the like may be used As the non-aqueous organic solvent, for example, an aprotic organic solvent such as N-methyl-2-pyrrolidinone, ethylene carbonate, propylene carbonate, butylene carbonate, dimethyl carbonate, diethyl carbonate, γ-butyrolactone, 1,2-dimethoxyethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like may be used.

As the organic solid electrolyte, for example, polyethylene derivatives, polyethylene oxide derivatives, polypropylene oxide derivatives, phosphoric acid ester polymers, poly agitation lysine, polyester sulfide, polyvinyl alcohol, polyvinylidene fluoride, polymers including ionic dissociation groups, or the like may be used.

As the inorganic solid electrolyte, for example, nitrides, halides, or sulfates of Li, such as $Li_3N$, LiI, $Li_5Ni_2$, $Li_3N$—LiI—LiOH, $LiSiO_4$, $LiSiO_4$—LiI—LiOH, $Li_2SiS_3$, $Li_4SiO_4$, $Li_4SiO_4$—LiI-LiGH, $Li_3PO_4$—$Li_2S$—$SiS_2$, or the like, may be used.

The lithium salt is a substance that is readily soluble in a non-aqueous electrolyte, and for example, LiCl, LiBr, LiI, $LiClO_4$, $LiBF_4$, $LiB10Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, imide, or the like may be used.

In addition, in order to improve charging/discharging characteristics, flame retardancy, and the like, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the liquid electrolyte. In some cases, a halogen-containing solvent such as carbon tetrachloride, ethylene trifluoride, or the like may be further included to impart incombustibility, carbon dioxide gas may be further included to enhance high-temperature storage characteristics, and fluoro-ethylene carbonate (FEC), propene sultone (PRS), or the like may be further included.

Meanwhile, yet another aspect of the present technology provides a battery module including the above-described secondary battery as a unit cell and also provides a battery pack including the battery module.

The battery pack may be used as power sources of medium-to-large-sized devices that require high-temperature stability and high rate characteristics such as long cycle characteristics, and specific examples of the medium-to-large-sized devices include: power tools powered by electric motors; electric vehicles including electric vehicles (EVs), hybrid electric vehicles (HEVs), plug-in hybrid electric vehicles (PHEVs), and the like; electric two-wheeled vehicles including electric bicycles (E-bikes) and electric scooters (E-scooters); electric golf carts; power storage systems; and the like, and more specific examples thereof include HEVs, but the present invention is not limited thereto.

Furthermore, the positive electrode and the negative electrode may be accommodated in a cylindrical battery, a prismatic battery, or a pouch-type battery while being wound in the form of a jelly roll or accommodated in a folding or stack-folding type in a pouch-type battery. For example, the lithium secondary battery according to the present technology may be a pouch-type battery.

As described above, the lithium secondary battery including the positive electrode active material according to the present technology may be used in a battery module or battery pack including a plurality of batteries as a unit cell. Specifically, the lithium secondary battery is useful in the fields of portable devices such as mobile phones, notebook computers, digital cameras, and the like and electric vehicles such as hybrid electric vehicles (HEV) and the like.

Hereinafter, the present invention will be described in further detail with reference to examples and experimental examples.

However, it should be understood that the following examples and experimental examples are given for the purpose of illustration only and are not intended to limit the scope of the present invention.

Example 1

To 100 g of a styrene-butadiene rubber (hereinafter, referred to as SBR, BM451B commercially available from ZEON Chemicals) binder dispersed in water as a solvent in a ratio of 60:40 (parts by weight), 500 g of an N-methyl-2-pyrrolidone (NMP) solvent was added and stirred. Then, the stirred mixture was heated at 100 to 120° C. for 2 hours to completely evaporate water contained therein to prepare an NMP-substituted SBR binder. Then, the NMP-substituted SBR binder and inorganic particles were mixed in a weight ratio of 50:50 and stirred to prepare an insulating composition. The prepared insulating composition had a viscosity of 5,000 cP.

Examples 2 to 4 and Comparative Examples 1 and 2

An insulating coating liquid was obtained in the same manner as in Example 1, except that the amounts of inorganic particles and a binder are changed in the preparation of an insulating composition.

Specific compositions of Examples 1 to 4 and Comparative Examples 1 and 2 are shown in the following Table 1.

TABLE 1

| | Insulating composition | | | |
|---|---|---|---|---|
| Classification | Solvent | Inorganic particle | Binder | Inorganic particle:Binder (weight ratio) |
| Example 1 | NMP | AlOOH | SBR | 50:50 |
| Example 2 | NMP | AlOOH | SBR | 60:40 |
| Example 3 | NMP | AlOOH | SBR | 75:25 |
| Example 4 | NMP | AlOOH | SBR | 80:20 |
| Comparative Example 1 | NMP | AlOOH | PVDF | 80:20 |
| Comparative Example 2 | NMP | AlOOH | PVDF | 88:12 |

Experimental Example 1. Measurement of Wet Adhesion of Insulating Layer

In order to evaluate the adhesion of an insulating layer according to the present technology, an experiment was performed as follows.

Metal Specimen Including Insulating Layer Formed Therein

Each of the insulating compositions prepared in Examples 1 to 4 and Comparative Examples 1 and 2 was applied onto an aluminum metal foil and dried to prepare a metal specimen in which an about 10 km-thick insulating layer was formed. The metal specimen including the insulating layer formed therein was blanked to a size of 2 cm×2 cm using a blanking device for adhesion measurement.

Application of Ultrasonic Waves 200 g of a liquid electrolyte (EC/EMC=3/7 (vol %)) was input into a 250 ml beaker, and the metal specimen including the insulating layer formed therein was immersed in the liquid electrolyte. In order to control the movement of the metal specimen, the metal specimen was immobilized with a jig.

Then, ultrasonic waves were applied to the liquid electrolyte in which the metal specimen was immersed using a sonicator (4200 commercially available from BANDELIN). In this case, conditions for applying ultrasonic waves were as follows.

Frequency: 20 kHz

Tip diameter: 13 mm (TS-113)

Amplitude: 100%

(in use of 13 mm tip, peak-to-peak 132 μm)

Results thereof are shown in the following Table 2 and FIG. 2.

TABLE 2

| Classification | Example 1 | Example 2 | Example 3 | Example 4 | Comparative Example 1 | Comparative Example 2 |
|---|---|---|---|---|---|---|
| Composition | AlOOH:SBR = 50:50 | AlOOH:SBR = 60:40 | AlOOH:SBR = 75:25 | AlOOH:SBR = 80:20 | AlOOH:PVDF = 80:20 | AlOOH:PVDF = 88:12 |
| Time (mins) | 19 | 19 | 19 | 15 | 5 | 10 |
| Termination temperature (° C.) | 109 | 109 | 109 | 100 | 71 | 87 |
| Comparison of wet adhesion | no swelling and no detachment | no swelling and no detachment | no swelling and no detachment | no swelling and no detachment | swelling | swelling and detachment |

FIG. 2 is a diagram showing results of measuring the wet adhesion of insulating layers of Examples 1 and 4 and Comparative Examples 1 and 2. Referring to Table 2 and FIG. 2, the electrode specimen of Example 1 did not show swelling or detachment of the insulating layer. However, in the case of Example 1, when 109° C. was reached, measurement was stopped as a measurement environment was changed by evaporating a solvent due to an increase in the temperature of a liquid electrolyte due to application of ultrasonic waves and the EMC boiling point of 107.5° C.

Although not shown in the figure, like Example 1, the electrode specimens of Examples 2 and 3 did also not show swelling or detachment of the insulating layer. However, when 109° C. was reached, measurement was stopped as a measurement environment was changed by evaporating the solvent due to the EMC boiling point of 107.5° C.

In the case of Example 4, swelling or detachment did not occur in the electrode specimen during 15 minutes of application of ultrasonic waves to a liquid electrolyte. However, although not shown in the figure, when 108° C. was reached as the temperature of a liquid electrolyte was increased due to continuous application of ultrasonic waves, swelling and detachment in the electrode specimen occurred.

In addition, in the case of Comparative Examples 1 and 2, swelling and detachment in the electrode specimen occurred in just 5 minutes of application of ultrasonic waves to a liquid electrolyte.

From the above results, it could be confirmed that the insulating layers of Examples had excellent wet adhesion compared to the insulating layers of Comparative Examples 1 and 2.

Experimental Example 2. Evaluation of Capacity Expression of Battery Cell

In order to evaluate the performance of the positive electrode including an insulating layer according to the present technology, a half-cell was fabricated, and then capacity expression was evaluated.

Fabrication of Half-Cell 96 parts by weight of $LiNi_{0.8}Co_{0.1}Mn_{0.1}O_2$ as a positive electrode active material, 2 parts by weight of polyvinylidene fluoride (PVDF) as a binder, and 2 parts by weight of carbon black as a conductive material were weighed and mixed in an N-methylpyrrolidone (NMP) solvent to prepare a positive electrode slurry. Then, the positive electrode slurry was applied onto an aluminum foil, dried, and roll-pressed to manufacture a positive electrode including a positive electrode active material layer (average thickness: 130 μm).

Then, the positive electrode was dip-coated with each insulating coating liquid obtained in Examples 1 to 3 and then dried in a convection oven (130° C.) to form a 10 μm-thick insulating layer in the positive electrode. A lithium foil as a negative electrode and a liquid electrolyte in which 1 M $LiPF_6$ was added in a solvent (EC:DMC:DEC=1:2:1) were used to fabricate a coin-type half-cell.

TABLE 3

| Insulating layer | Battery |
|---|---|
| Example 1 | Example 5 |
| Example 2 | Example 6 |
| Example 3 | Example 7 |

Measurement of Discharge Capacity

The discharge characteristics of the batteries of Examples 5 to 7 were evaluated under the following conditions. Also, the discharge characteristics were measured each at room temperature (25° C.) and high temperature (45° C.).

Discharge: 0.1 C, 0.33 C, 0.5 C, 1.0 C, 2.5, cut-off

Meanwhile, to compare the capacity expression of each battery, a battery cell including an electrode including no insulating layer was used as Comparative Example 3. Results thereof are shown in Tables 4 and 5 and FIGS. 3 and 4.

TABLE 4

| | Insulating composition | | | | Room-temperature discharge rate (%) | | | |
|---|---|---|---|---|---|---|---|---|
| Classification | Solvent | Inorganic particle | Binder | Inorganic particle:Binder (weight ratio) | 0.1 C | 0.33 C | 0.5 C | 1.0 C |
| Comparative Example 3 | — | — | — | — | 100.00 | 100.00 | 100.00 | 100.00 |
| Example 5 | NMP | AlOOH | SBR | 50:50 | 0.33 | 0.06 | 0.05 | 0.00 |
| Example 6 | NMP | AlOOH | SBR | 60:40 | 0.60 | 0.09 | 0.05 | 0.03 |
| Example 7 | NMP | AlOOH | SBR | 75:25 | 0.27 | 0.06 | 0.03 | 0.00 |

TABLE 5

| | Insulating composition | | | | | | | |
|---|---|---|---|---|---|---|---|---|
| | | Inorganic | | Inorganic particle:Binder | High-temperature discharge rate (%) | | | |
| Classification | Solvent | particle | Binder | (weight ratio) | 0.1 C | 0.33 C | 0.5 C | 1.0 C |
| Comparative Example 3 | — | — | — | — | 100.00 | 100.00 | 100.00 | 100.00 |
| Example 5 | NMP | AlOOH | SBR | 50:50 | 2.23 | 0.21 | 0.15 | 0.05 |
| Example 6 | NMP | AlOOH | SBR | 60:40 | 1.41 | 0.18 | 0.15 | 0.03 |
| Example 7 | NMP | AlOOH | SBR | 75:25 | 15.35 | 0.18 | 0.15 | 0.03 |

Referring to Tables 4 and 5 and FIGS. 3 and 4, in the case of high-temperature discharging (45° C.), the battery of Example 7 partially expressed capacity when discharged at 0.1 C, whereas the batteries of Examples 5 and 6 hardly expressed capacity in the case of room-temperature discharging (25° C.).

The above result is considered to be due to the fact that the insulating layer prevents the migration of lithium ions in the overlay region of the electrode to suppress capacity expression and the like during discharging by having excellent wet adhesion in a liquid electrolyte. Accordingly, in the case of the lithium secondary battery according to the present technology, degradation of capacity according to a cycle increase can be suppressed, and safety can be improved.

While the present invention has been described above with reference to the exemplary embodiments, it can be understood by those skilled in the art that various modifications and alterations may be made without departing from the spirit and technical scope of the present invention described in the appended claims.

Therefore, the technical scope of the present invention should be defined by the appended claims and not limited by the detailed description of the specification.

The invention claimed is:

1. A positive electrode for a lithium secondary battery, comprising:
- a current collector;
- an active material layer formed on one surface or both surfaces of the current collector and including a positive electrode active material, a conductive material, and a non-aqueous binder; and
- an insulating layer provided on a side of the active material layer,
- wherein the insulating layer is formed of an aqueous binder dispersed in a non-aqueous solvent,
- wherein the non-aqueous binder includes polyvinylidene fluoride (PVDF), and the aqueous binder includes styrene-butadiene rubber dispersed in N-methyl-2-pyrrolidone, and
- wherein the insulating layer is provided on the current collector so that the insulating layer covers from a portion of a non-coating part of the current collector to a portion of the active material layer applied onto the current collector.

2. The positive electrode of claim 1, wherein the insulating layer is provided on the current collector so that the insulating layer covers from a portion of a non-coating part of the current collector to a portion of a sliding region of the active material layer applied onto the current collector, and
- a height of the insulating layer ranges from 10 to 50% of a height of the active material layer.

3. The positive electrode of claim 1, wherein the insulating layer is provided on the current collector so that the insulating layer covers from a portion of a non-coating part of the current collector to a portion of a sliding region of the active material layer applied onto the current collector, and
- a height of the insulating layer ranges from 50 to 100% of a height of the active material layer.

4. The positive electrode of claim 1, wherein the insulating layer has an average thickness ranging from 1 μm to 50 μm.

5. The positive electrode of claim 1, wherein the insulating layer further includes an inorganic particle, and
- a weight ratio of the inorganic particle and the aqueous binder ranges from 1:99 to 95:5.

6. The positive electrode of claim 5, wherein the inorganic particle is one or more selected from the group consisting of AlOOH, $Al_2O_3$, $Al(OH)_3$, $Mg(OH)_2$, $Ti(OH)_4$, MgO, CaO, $Cr_2O_3$, $MnO_2$, $Fe_2O_3$, $Co_3O_4$, NiO, $ZrO_2$, $BaTiO_3$, $SnO_2$, $CeO_2$, $Y_2O_3$, $SiO_2$, silicon carbide (SiC), and boron nitride (BN).

7. The positive electrode of claim 1, wherein the aqueous binder further includes one or more selected from the group consisting of acrylate styrene-butadiene rubber, acrylonitrile-butadiene rubber, acrylonitrile-butadiene-styrene rubber, acrylic rubber, polyethylene oxide, polyvinylpyrrolidone, polyepichlorohydrin, polyphosphazene, polyacrylonitrile, polystyrene, an ethylene-propylene-diene copolymer, polyvinylpyridine, chlorosulphonated polyethylene, latex, polyester resin, an acrylic resin, phenolic resin, an epoxy resin, polyvinyl alcohol, hydroxypropyl methylcellulose, hydroxypropyl cellulose, and diacetyl cellulose.

8. The positive electrode of claim 1, wherein the non-aqueous binder further includes one or more selected from the group consisting of polyvinylidene fluoride-co-hexafluoropropylene (PVDF-co-HFP), polyacrylic acid (PAA), polyimide (PI), polyamideimide (PAI), and a polyimide-polyamideimide copolymer (PI-PAI).

9. A lithium secondary battery comprising the positive electrode for a lithium secondary battery according to claim 1 and an electrolyte.

* * * * *